Oct. 15, 1968 A. LENDER 3,406,255

DATA TRANSMISSION TECHNIQUES USING ORTHOGONAL FM SIGNAL

Filed June 2, 1965 8 Sheets-Sheet 1

INVENTOR
ADAM LENDER
BY [signature]
ATTY.

3,406,255
DATA TRANSMISSION TECHNIQUES USING ORTHOGONAL FM SIGNAL

Adam Lender, Palo Alto, Calif., assignor, by mesne assignments, to Automatic Electric Laboratories, Inc., Northlake, Ill., a corporation of Delaware Filed June 2, 1965, Ser. No. 460,753
29 Claims. (Cl. 178—67)

ABSTRACT OF THE DISCLOSURE

Apparatus and method for generating the frequency modulated signal utilizing a single frequency source, means for deriving from said source a train of pulses of twice the bit rate of the binary data signal, means including a bistable device gated in a complementary manner by a combination of said binary data signal and said train of pulses for providing a two-phase coded waveform and filter means for converting the two-phase coded waveform into said frequency modulated signal.

Apparatus and method for the recovery of the binary information from the orthogonal frequency modulated signal utilizing means for delaying said frequency modulated signal by one half bit interval, product modulator means for comparing the undelayed frequency modulated signal with the delayed frequency modulated signal and low pass filter means connected to the output of said product modulator for eliminating alternating current components in the output of said filter means which are equal to or greater than said bit rate. Because of correlation characteristics the low pass filter output will have a minimum and maximum level. One of these levels is indicative of one and the other level of the other state respectively of said binary data signal. Synchronous sampling of said low pass output wave at the binary data rate produces a replica of the binary data signal.

The invention relates to data transmission techniques and particularly to techniques for transmitting data by means of frequency modulation.

In digital transmission it often becomes necessary to transmit binary data with a high degree of frequency stability and negligible intersymbol interference. On the basis of prior art techniques this is difficult, if not impossible, to accomplish for the case of binary FM with continuous phase. The fundamental reason is that binary FM inherently requires two frequencies to represent two binary states and to build a continuous phase system with two separate oscillators becomes a complicated problem. Reference is made, for example, to W. R. Bennett and J. Salz, "Binary Data Transmission by FM Over a Real Channel," Bell Syst. Tech. J., vol. 42, September 1963, p. 2405. An alternative would be to provide FM keying or a reactance modulator with a single oscillator. While such a system has a continuous phase at the bit transition points, the frequency accuracy is relatively low and the bit rate is not locked to the Mark and Space frequencies.

A theoretically ideal binary FM system has been postulated in the technical literature, see E. D. Sunde, "Ideal Binary Pulse Transmission by AM and FM," Bell Syst. Tech. J., vol. 38, November 1959, pp. 1357–1426. In the system visualized in the last-mentioned reference the difference between the Mark and Space frequencies equals the bit rate; in addition, the Mark and Space frequencies are locked to the bit rate. To illustrate the main difficulty in realizing such a system with presently known methods, it is interesting to consider the following numerical example. Suppose the bit rate of $C=1200$ bits per second (b.p.s.) is required with Mark and Space frequencies $f_M=132,000$ c.p.s. and $f_S=133,200$ c.p.s., being locked to the bit rate.

With the presently known methods realization of such a system would be exceedingly complex and impractical.

It is accordingly an object of the present invention to provide an FM technique by which binary data can be transmitted with high frequency stability and low or negligible intersymbol interference.

It is a more particular object of the invention to generate an FM signal which exhibits the last-mentioned characteristics and which, furthermore, has continuous phase at the bit transition points, has an integral number of cycles per bit interval in which the frequencies are locked to the bit rate and in which the difference between the two frequencies is equal to the bit rate.

It is another object of the invention to provide techniques by which such an FM signal can be reliably detected, preferably also under adverse signal-to-noise conditions.

According to a principal feature of the present invention only a single frequency source is used in producing a signal whose Mark and Space frequencies are locked to the bit rate. By merely controlling this frequency source, Mark, Space and the bit rate frequencies are controlled and, therefore, a high degree of frequency accuracy can be achieved. As a result of locking the three frequencies, the phases of the Mark and Space carriers are always zero at the digit transition points and there is a negligible intersymbol interference.

Another feature of the invention consists in that the above signal is generated through a combination of digital coding, which introduces correlation, and analog processing. In this manner two coherent frequencies are produced, in spite of the fact that only a single frequency source is needed. The net result is a signal consisting of two orthogonal frequencies representing Mark and Space. Such a signal may be referred to as a binary orthogonal FM signal.

At this point reference is made to my copending applications Ser. No. 342,891, filed Feb. 6, 1964, now Patent No. 3,263,185, and Ser. No. 434,583, filed Feb. 23, 1965. Both of these applications relate to the synchronous frequency modulation of digital data, as does the instant application. However, the line signal produced in the present application is quite different from the line signals produced in the above earlier applications. While also in the copending applications the phase of the line signal is continuous, the phase in these earlier disclosures is not always zero at the bit transition points as it is in the case of the instant application. Furthermore, in the case of the copending applications, either the Mark frequency or the Space frequency does not have an integral number of cycles per data bit—while in the present application both the Mark and Space frequencies contain an integral number of cycles for each data bit. Along with the above differences in the line signal there are also substantial differences in the coding techniques used in the present application. For the above reasons the present invention is in the nature of an improvement over the techniques disclosed in the copending applications.

Because of the stability of the above signal, recovery of the information is facilitated even where conventional recovery techniques are used. According to a further feature of the invention, additional improvement can be obtained by taking advantage of the fact that the orthogonal FM signal contains both continuous and discrete components. The continuous component carries the information. The discrete components are two steady tones, that is, two frequencies which are present at all times and have exactly the same values as the Mark and Space frequencies, respectively. This means that the two steady frequencies appear at the same two points in the spectrum as the Mark and Space frequencies. These tones are coherently related to the information carrying frequencies and contain half of the total power. The frequency difference between the two discrete components is equal to the bit rate and this information can be used to provide a bit clock reference frequency with consistent phase for the recovery process.

It is yet another feature of the invention that the above-mentioned properties of the transmitted wave are used to recover the binary data by differentially coherent or absolute reference coherent techniques.

It may be mentioned here that a differentially coherent detection method has previously been disclosed in my copending application Ser. No. 434,595, filed Feb. 23, 1965. However, the differentially coherent detection technique according to the present application relates to a line signal with different properties. Furthermore, as will be appreciated from the following description, the detection technique according to the instant application uses a one-half bit delay to provide the desired correlation whereas in the copending patent application a one bit delay is employed. In short, the differentially coherent detection technique according to the present application and that disclosed in the copending application could not be used interchangeably.

Other objects, features and advantages of this invention will be appreciated from a consideration of the following detailed description together with the drawings wherein.

Figure 1:
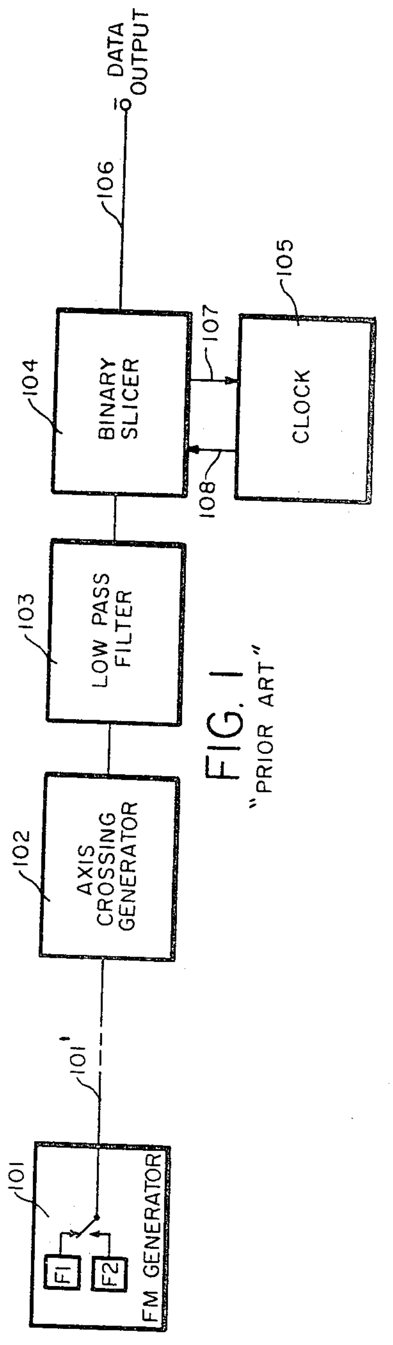
FIGURE 1 is a schematic showing of a typical FM data transmission arrangement of the prior art.

The essential objective of an FM data transmission system is to convert binary data into an FM signal for transmission over an intervening transmission medium and to recover the original data at the receiving terminal. FIG. 1 illustrates schematically how this objective was typically met in the prior art. As described hereinbefore, the FM generator of the prior art, designated 101 in FIG. 1, consists essentially of two oscillators or a single oscillator that is shifted from one frequency to another, one frequency, F1, representing the Marking condition and the other frequency, F2, representing the Spacing condition. At the other end of the transmission medium 101′ the FM signal is most often recovered by a discriminator or an axis-crossing generator 102, a low-pass filter 103 and a binary slicer 104. The data clock 105 at the receiving end is controlled, in effect, by information derived from the binary data output 106. Conceptually, this is a feedback technique and this feedback arrangement has been schematically indicated in FIG. 1 by connections 107 and 108. Such a feedback technique has the disadvantage that control of the data clock follows the variations in recovered data. Thus it is necessary to have a sufficiently long binary data stream to initially establish the data clock reference frequency and to insure that the accuracy of the reference frequency is maintained. As will be appreciated from the following description, the steady frequencies of the discrete components of the orthogonal FM signal according to the invention may, in contrast, be used in a feed-forward arrangement to precisely control the frequency and phase of the data clock at the receiver.

Turning now to the various embodiments of the FM data transmission techniques according to the invention shown herein, it is to be noted that the means of generating the orthogonal FM signal and the means for detection or demodulation have been illustrated separately. This was done since any one of the generating means may be used with any one of the detection or demodulation means to provide a data transmission system using the techniques of my invention. In the following description the generating means are first described and then, after a mathematical analysis of the principles underlying the present invention, the detection or demodulation techniques are described.

*Transmitting techniques*

Three techniques of generating the binary orthogonal FM signal according to the invention at the transmitting end will now be described by way of example. In each of these three embodiments, the orthogonal FM signal is obtained by the combination of digital coding, which introduces correlation into the data signal, and an appropriate analog process. The original binary data input consisting of Marks and Spaces having a bit time internal T and, therefore, a bit speed of $1/T$ bits per second (b.p.s.), is treated as if it were a data signal of $2/T$ b.p.s. That is, each Mark is regarded as consisting of a pair of binary 1's and each Space as a pair of binary 0's, with each binary digit having a duration of $T/2$ seconds rather than T seconds. Thus a sequence of MMSMSSM (M and S standing for Mark and Space, respectively) at $1/T$ b.p.s. is regarded as a sequence 11110011000011 at $2/T$ b.p.s. Although the digital coding techniques used in the three embodiments differ in details, all three employ a data clock which samples the binary data input at $2/T$ pulses per second and a flip-flop—a bistable multivibrator—which is gated in a complementary manner by the appropriate combination of binary data and clock pulses. The output of this flip-flop consists of 1's and 0's at the rate of $2/T$ b.p.s., that is, twice the rate of the original data signal. The result is that correlation is introduced in the signal and, at the output of the flip-flop, the Mark and Space conditions of the original data are now represented respectively by binary digits 10 and 00. Where Mark and Space are equally likely in the original binary data, their binary representation at the output of the flip-flop will have three times as many binary 0's as 1's. Further there will always be an odd number of 0's between successive binary 1's and two consecutive binary 1's will never occur.

Figure 2:
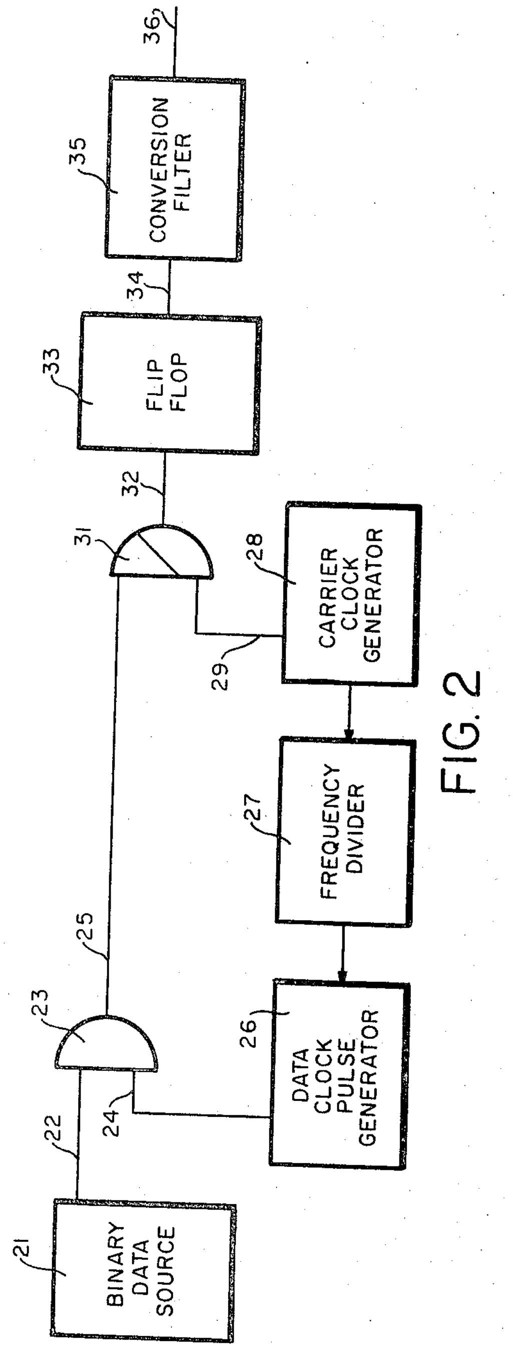
FIGURE 2 is a schematic diagram of one arrangement of converting binary data into an orthogonal FM signal, using a square wave carrier, in accordance with the techniques of this invention.
Figure 3:
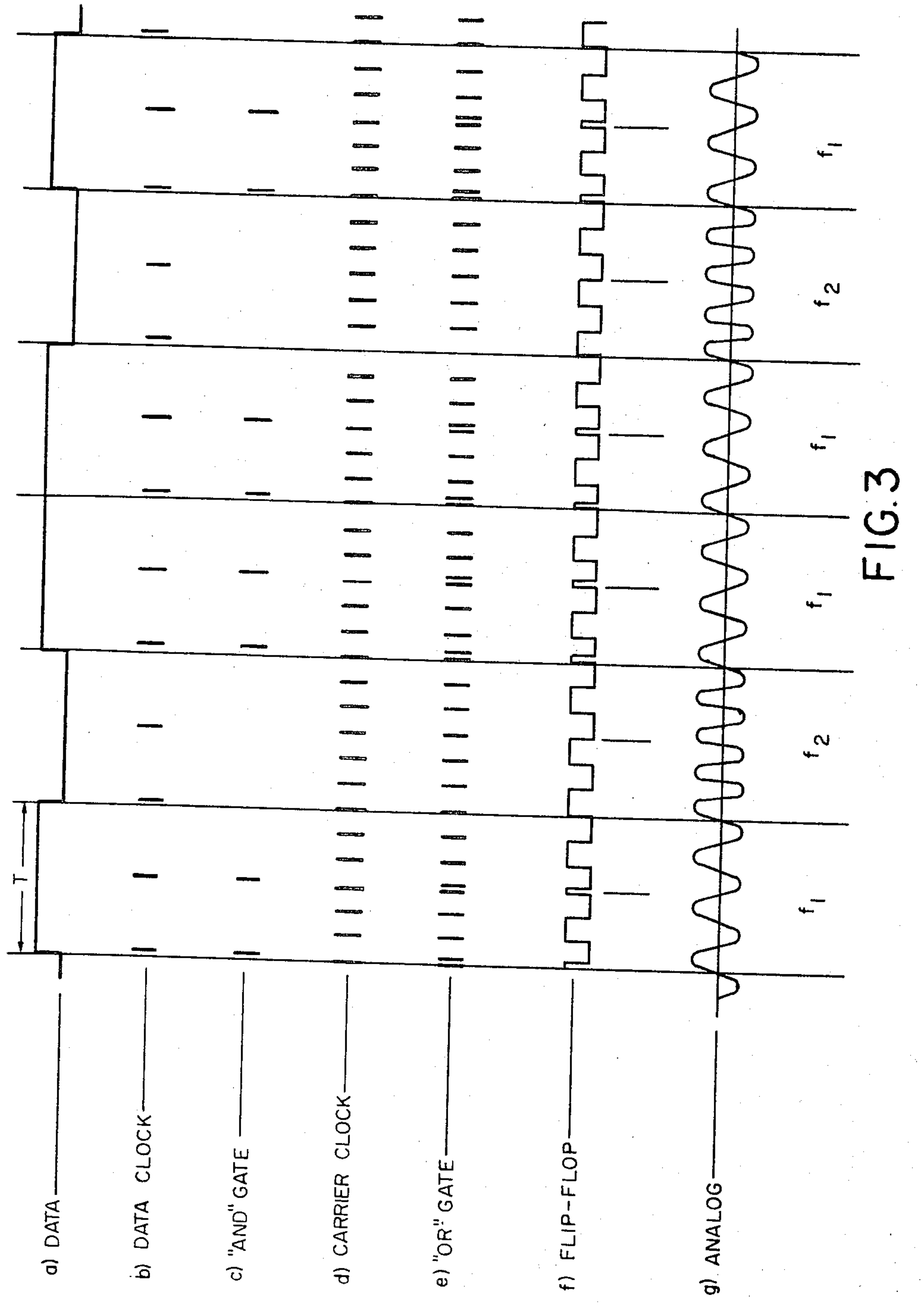
FIGURE 3 is a graphical illustration of the waveshapes at various points in the diagram of FIGURE 2.
Figure 4:
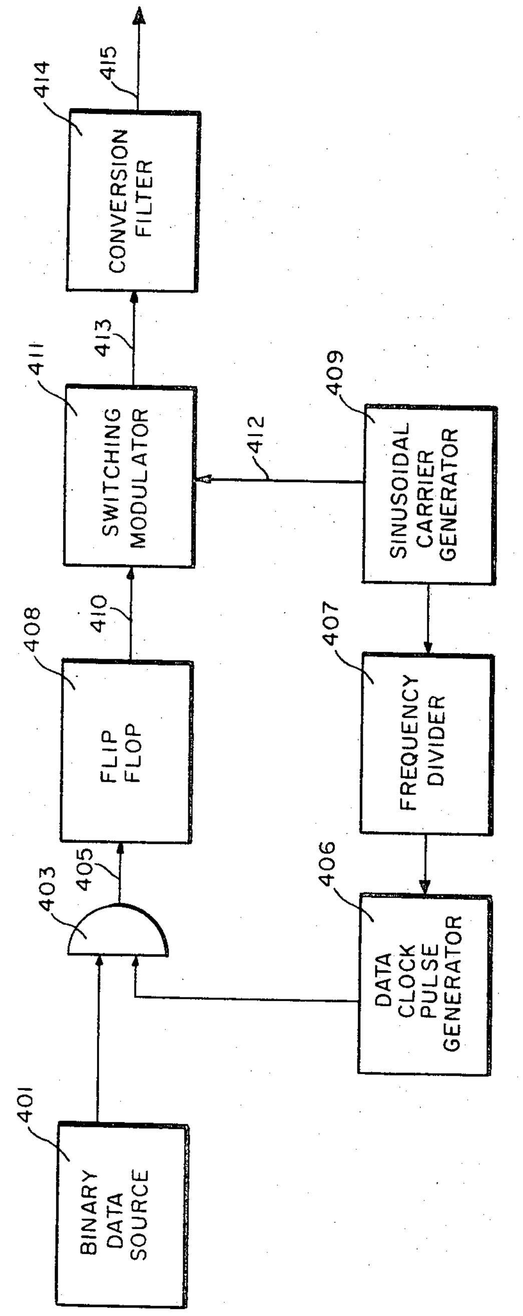
FIGURE 4 is a schematic diagram of a second arrangement of converting the binary data into an orthogonal FM signal, using a sinusoidal carrier.
Figure 5:
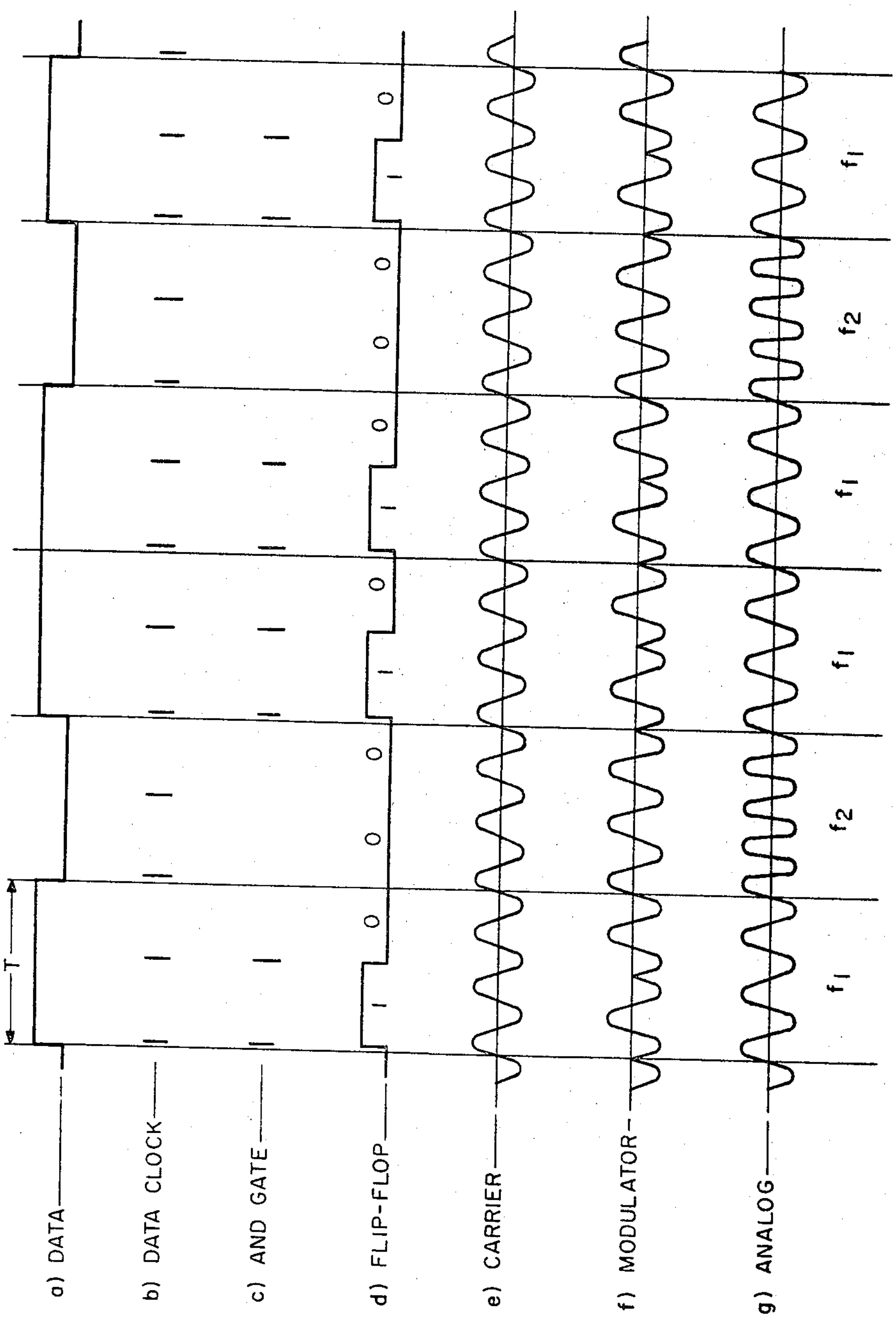
FIGURE 5 is a graphical illustration of the waveshapes appearing at pertinent points in the diagram of FIGURE 4.

In the first two embodiments the digital coding produces a two-phase modulated carrier which in the embodiment illustrated in FIGS. 2 and 3 is a square wave carrier and in the embodiment of FIGS. 4 and 5 a sine wave carrier. In the two-phase modulated carrier of both of these embodiments a Mark of the original binary data is represented by 10 and a Space by code 00 in terms of phase, the binary 1 in this code being 0° and binary 0 being 180° phase. Reference is made to line (*f*) in FIGS. 3 and 5.

Figure 6:
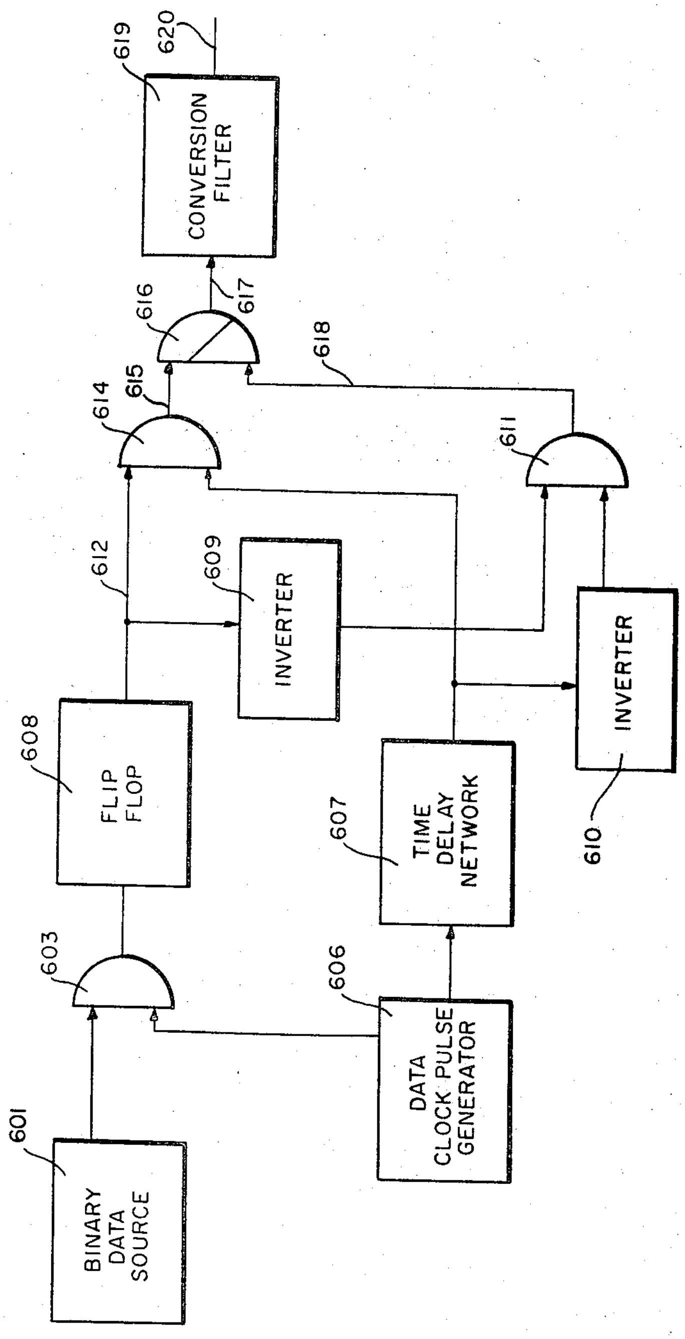
FIGURE 6 is a schematic diagram of a third arrangement of converting the binary data into an orthogonal FM signal, without using a carrier as was done in the first two arrangements, in accordance with the techniques disclosed in this invention.
Figure 7:
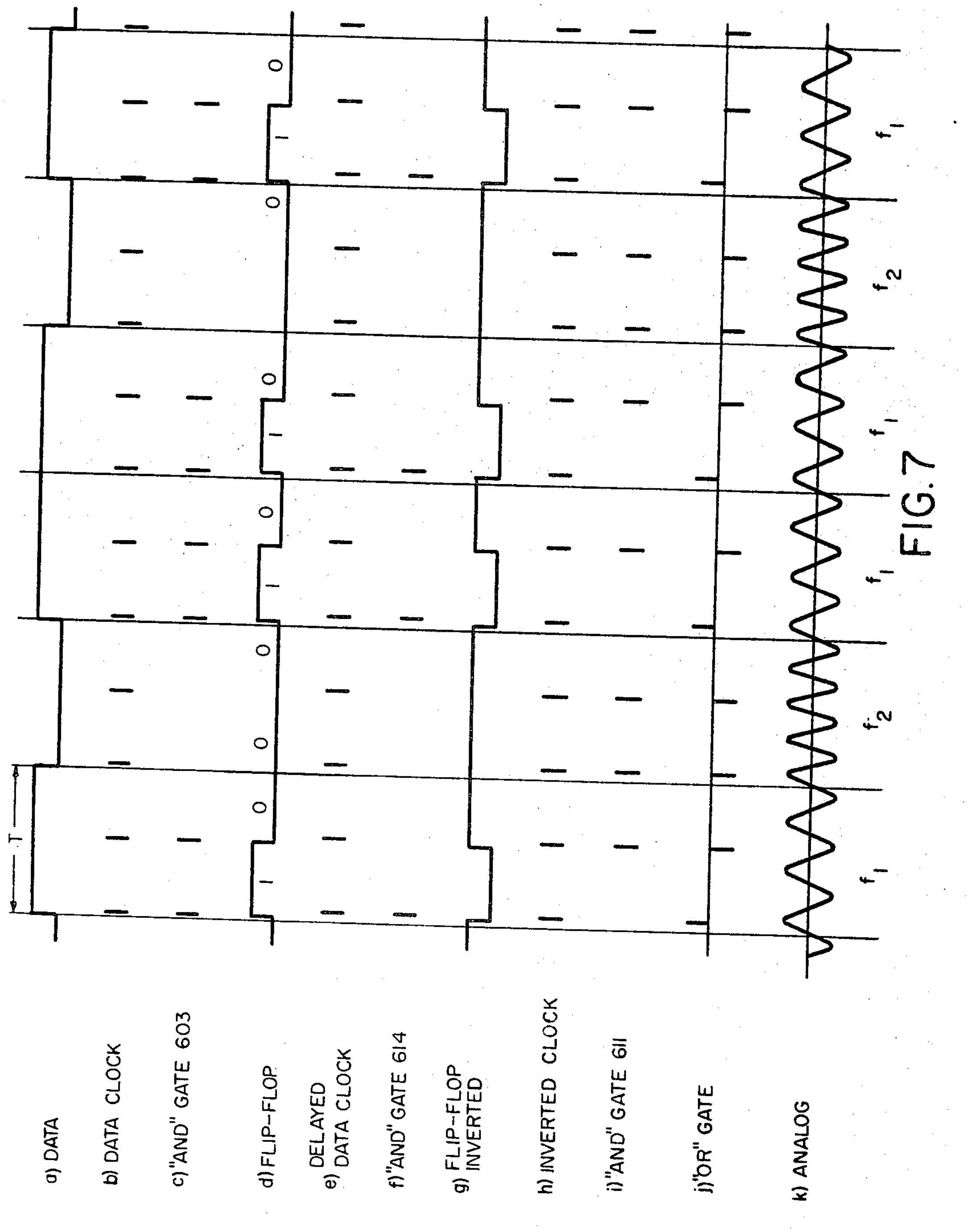
FIGURE 7 is a graphical illustration of the waveshapes appearing at various pertinent points in the diagram of FIGURE 6.

In the third embodiment shown in FIGS. 6 and 7 the digital coding results in a train of narrow, positive or negative pulses of equal magnitude with a Mark of the original binary data being represented by 10, that is, in this case a positive pulse followed by a negative pulse, and a Space by 00, that is, two consecutive negative pulses. In this last-mentioned embodiment a carrier, strictly speaking, is not used, however it may be said that a two-phase modulated carrier is, in effect, simulated. In all three embodiments only a single frequency source is used. In the first and second embodiments the carrier source is used for this purpose, the data clock being derived from the carrier source through the medium of a frequency divider; in the third embodiment where no carrier is used, the data clock itself serves as the single frequency source.

The final step in all three embodiments is to pass the coded signal which, as explained above, is modulated at twice the original bit rate, through a conversion filter for analog processing. This filter converts the coded signal into a binary FM signal of the original bit rate, which has two orthogonal frequencies and predetermined phases at the transition points. It is this binary FM signal which is transmitted over the transmission medium.

Turning now to the details of the embodiment shown in FIGS. 2 and 3, data from binary source 21, FIGURE 2, is applied to AND gate 23 at input 22. Data clock pulse generator 26 applies clock pulses at twice the binary data rate to input 24 of this same AND gate. Data clock pulse generator 26, in turn, is driven from carrier clock generator 28 through the medium of frequency divider 27. The data clock pulses are slightly delayed with respect to the binary data so that a Mark or Space change will precede the data clock pulse at that point. This is shown graphically in lines *a* and *b* of FIGURE 3. Such a delay could be the natural result of the frequency divider or counter used to derive the data clock frequency from the carrier clock. As an alternative, a time delay circuit could be used. In any case, the delay is not critical, but should insure that the data clock pulse occurs after the binary data change and between carrier clock pulses. As a result, for each binary Mark there will be two output pulses on lead 25 which will occur at the data clock rate. OR gate 31 accepts the pulses from lead 25 and from output lead 29 of carrier clock generator 28. The carrier clock is synchronized with the binary data clock and its pulse rate is an integral multiple of that of the data clock. It should be noted that, in a practical implementation, a binary data clock, not shown in FIG. 2, would be used in addition to the data clock and the carrier clock. This binary data carrier would have a pulse rate equal to $1/T$ and it would serve to control the binary data; this binary data clock, too, would be derived from and synchronized with the carrier clock. In the embodiment according to FIGS. 2 and 3, the pulse repetition rate of the carrier clock has been chosen to be $6/T$, as shown in line *d* of FIG. 3. This means that the step-down ratio for the frequency divider 27 required to produce a data clock pulse rate of $2/T$ is 3:1.

Since the data clock is derived from the carrier clock, the frequency and phase relationship between these two is locked. However, as indicated above, the method of deriving the data clock from the carrier is designed to delay the data clock so that the output pulses are not coincident with those of the carrier clock. Thus, an output pulse from AND gate 23 will be slightly spaced in time from an output from the carrier clock 28 and both will appear at the output of OR gate 31 in this time relationship. This is shown in *e* of FIGURE 3. Flip-flop 33 will change state each time a pulse is present on its input lead 32. This will occur for each positive pulse from the carrier clock 28. If it were for the carrier clock alone, flip-flop 33 would change state once for every output of carrier clock generator 28. However, because of the delay in the data clock output, the pulses from AND gate 23 representing the binary Mark are interleaved with those of the carrier clock. Presence of a pulse from the AND gate causes an intermediate change in the state of the flip-flop. As a result, a two-phase modulated square wave, shown in line *f* of FIG. 3, is obtained at the output 34 of flip-flop 33, which because of the frequency division effect of the flip-flop, has a fundamental or carrier frequency equal to half the pulse repetition rate of the carrier clock controlling the flip-flop. The foregoing characteristics of the square wave illustrated in line *f*, FIG. 3, will become more apparent yet from the comparison which is made, further below between this two-phase modulated square wave and the two-phase modulated sine wave shown at *f* of FIG. 5.

It will be noted from the above that, in the present example, the carrier frequency of the square wave at line *f*, FIG. 3, is $f_C=3/T$. More generally, and as fully explained in the mathematical portion of this description further below, this carrier frequency is chosen according to the relationship $f_C=n/T$, where $n$, the number of carrier cycles per bit, is an integer equal to or greater than 2.

The signal shown in line *f* of FIG. 3, which is two-phase modulated at twice the bit rate, can be directly applied to the analog conversion device 35 which as a bandpass filter of appropriate design and bandwidth. The resultant output from conversion filter 35 is a frequency modulation signal in which the Mark and Space frequencies are represented by two orthogonal wave shapes, sinusoids, as shown at *g* of FIG. 3.

The bandpass filter is designed to pass the carrier and one of the two sideband frequencies. As will become clearer from the mathematical analysis given further below, where the upper sideband is selected, $f_1$, representing Mark, is equal to the carrier frequency $f_C$, while $f_2$, representing Space is equal to the upper frequency $f_U=f_C+1/T$. For the lower sideband, $f_2$, representing Space, is equal to the carrier frequency $f_C$, and $f_1$, representing Mark, becomes equal to the lower frequency $f_L=f_C-1/T$. It will thus be seen that the showing in line *g* is based on the assumption that the upper sideband has been selected in conversion filter 35. For, as will be apparent from FIG. 3, in the example underlying this figure, Mark frequency $f_1=f_C=3/T$ and Space frequency $f_2=f_C+1/T=4/T$.

It was mentioned above that the carrier frequency $f_C$ was chosen according to the relationship $f_C=n/T$, where $n$ is an integer and equal to or greater than 2. The reason for this last-mentioned requirement is that both the Mark frequency $f_1$ and the Space frequency $f_2$ should have an integral number of cycles per bit, and since the lower of these two frequencies becomes $f_L=f_C-1/T$, this requirement cannot be satisfied for a carrier frequency $f_C$ lower than $2/T$. Thus, $n$, the number of cycles per original data bit can be any integer except 1, that is, 2, 3, 4, 5, 6, etc.

It will be noted that the line signal has an integral number of cycles per bit, namely 3 or 4 in the embodiment of FIGS. 2 and 3, and that the phase of this signal is always zero at the bit transition points. It is also apparent that the signal wave has continuous phase and that both frequencies are locked with the bit speed ($1/T$) so that intersymbol interference is almost absent.

The embodiments of this invention can be arranged to operate in either of two modes. For example, the AND gate 23 in FIGURE 2 can be designed to produce an output at lead 25 for either positive or negative coincidences of inputs from the data source 21 and the data clock 26. To simplify the discussion only the condition where positive inputs produce an output is described. It is understood that the invention would perform equally well in either mode. The Mark conditions of the binary data source and the data clock pulse output are both taken as positive.

A second arrangement for generating an orthogonal FM signal which represents a binary data input signal is shown in FIGURES 4 and 5. Here a sinusoidal carrier generator 409, FIG. 4, is used which is operating at a frequency $f_C=n/T$ where $n$ again is an integer equal to or greater than 2. In the present embodiment, as in the previous case, $n$ has been assumed to be 3. Again the data clock pulse rate is twice that of the input binary data source 401. These relationships are demonstrated graphically in lines *a*, *b* and *e* of FIGURE 5. It is also shown that the binary data and the carrier are in phase and that the data clock pulses which are derived from the carrier are slightly delayed with respect thereto. The data clock pulse generator 406 is derived from sinusoidal generator 409 through frequency divider 407. In the instant case, the sinusoidal carrier, while directly impressed on switching modulator 411 via output lead 412, is impressed on frequency divider 407 through well-known means not particularly shown in FIG. 4 but assumed to form part of block 409, by which the frequency at the input of the frequency divider is, in effect, doubled. If this is done, then for a sinusoidal carrier frequency $f_C=3/T$, the frequency or pulse rate at the input of frequency divider 407 is $6/T$ and, again assuming a frequency step-down of 3:1 in the frequency divider, the data clock rate becomes $6/T:3=2/T$. The same result could be accomplished if the above doubling of the frequency were carried out on the output side, rather than the input side, of frequency divider 407.

As explained for the embodiment of FIGURE 2, the coincidence of binary data from binary data source 401 and data clock pulses from data clock generator 406 at the input to AND gate 403 cause an output pulse to appear on lead 405. Two such pulses will occur for each binary data mark. Flip-flop 408 will change state with each pulse and the original binary data will be transformed into binary digits of 10 representing the Marking and 00 representing the spacing conditions. This is shown graphically at *d* of FIGURE 5.

The output 410 of flip-flop 408 modulates the sinusoidal carrier in switching modulator 411. The Mark-To-Space and Space-To-Mark transitions of the flip-flop signal cause a 180° phase reversal of the carrier in the output signal lead 413 from the switching modulator as shown in *f* of FIGURE 5. Processing this signal through conversion filter 414, in which either the upper or lower sideband may be selected, produces an orthogonal FM output signal at 415, with characteristics identical to those described for the circuit of FIGURE 2. Again, the showing in the corresponding line *g* of FIG. 5 is based on the assumption that the upper sideband has been selected in filter 414.

Reverting for a moment to the embodiment illustrated in FIGS. 2 and 3, it was mentioned above that line *f* of FIG. 3 shows a square wave carrier two-phase modulated according to the digital code 10 for Mark and 00 for Space with the binary 1 of this code being represented by 0° phase and the binary 0 by 180° phase. This change in phase occurs because of the data clock pulses which are permitted to occur during the Marking interval. Referring to line *f* of FIGURE 3, a narrow pulse occurs at the beginning and in the middle of each binary data Mark, whereas during a Space, the pulse widths are continuous. It can be shown analytically that where the narrow pulse occurs there is in fact a 180° change in phase. This can be appreciated conceptually by comparing *f* of FIGURE 3 with *f* of FIGURE 5. The waveform in *f* of FIGURE 5 is similar to that which would be obtained if the pulse waveform of FIGURE 3 were passed through a network having a delay such that the full pulse amplitude could not be obtained for the narrow pulse but would be obtained during the broad pulse. It is apparent from *f* of FIGURE 5 that the phase of the waveform during the first half of data Mark is different by 180° from that of the last half of the same Mark. Further, the phase does not change during a data Space and the phase of the Space condition is the same as that for the last half of the data Mark. Thus, regardless of the type of carrier employed and the digital coding technique used, each condition of the original binary data is represented by two binary digits with 10 and 00 representing Mark and Space respectively.

A third arrangement of deriving the orthogonal FM signal is shown in FIGS. 6 and 7. The cooperation among the binary data source 601, the data clock pulse generator 606, the AND gate 603, and the flip-flop 608 is as described for the corresponding elements in FIGURE 4, that is, an output is produced in which the binary digits 10 represent Mark and 00 represent Space. This is shown graphically at *a*, *b*, *c* and *d* in FIGURE 7. The flip-flop output and a delayed clock pulse, from time delay network 607, are applied to AND gate 614. The delay introduced by network 607 is sufficient so that at output lead 615 of gate 614 a pulse occurs only during each "1" of the flip-flop output, i.e. during the first half of each Mark. This is shown at *f* of FIGURE 7.

A second output is taken from both the flip-flop and the time delay network. These second outputs are applied to inverters 609 and 610, respectively, and thence applied to Coincidence gate 611, as shown. More particularly, inverter 610 functions to reverse the polarity of the delayed data clock pulses, and coincidence gate 611 is designed to gate these inverted, that is, negative pulses through to lead 618 while the inverted flip-flop wave is at its upper level as viewed in line *g* of FIG. 7. As a result a negative-going pulse is obtained at the output of 611 for each 0 of line *d*, as shown at *i* of FIGURE 7. The outputs from AND gates 611 and 614 are combined in OR gate 616 to produce a pulse train of positive and negative going pulses. The pulses occur at twice the binary data rate, and a Mark is represented by a positive and negative pulse and a Space by two negative pulses. Applying this signal via lead 617 to the conversion filter 619, which is designed to select the desired frequency range, results in the output signal on line 620, as shown graphically at *k* in FIGURE 7; again it is assumed that the upper sideband has been selected in the conversion filter. A signal is thus obtained which is orthogonal FM, with characteristics of the signals derived by the previous two methods.

As will be appreciated from the foregoing description, no carrier is used in this embodiment, the effect of a carrier being simulated by the use of other circuits. In this third embodiment, therefore, the data clock serves as the one and only source from which the various frequencies are derived, and no frequency divider is required.

*Mathematical analysis*

Formation of the signal may also be shown analytically. For simplicity of analysis, it is assumed that the original data input consists of Marks and Spaces occurring independently with a probability of 1/2. In accordance with the coding and generation of the two-phase single frequency modulated signal, the waveshapes $g_M(t)$ and $g_S(t)$ for Mark and Space respectively are:

$$g_M(t)=\left[u(t)-2u\left(t-\frac{T}{2}\right)+u(t-T)\right]f(t) \tag{1}$$

$$g_S(t)=-[u(t)-u(t-T)]f(t) \tag{2}$$

where $u(t)$=unit step $f(t)$=carrier, which can have one of three possible waveshapes—square, sinusoidal (both with an integral number of carrier cycles per bit), or a narrow pulse T=time interval of the binary data and $$kT\leq t<(k+1)T$$

with $k$=an integer.

Let $a$ be the random pulse train assuming values +1 or −1 which correspond to the occurrence of Marks and Spaces in digit slots. Then in any one interval of duration T the waveform $m(t)$ is:

$$m(t)=\frac{1+a}{2}g_M(t)+\frac{1-a}{2}g_S(t) \quad (3)$$

for $$kT\leq t<(k+1)T$$

Since $a$ is a random variable assuming $\pm 1$ values with equal likelihood and independently, in any bit interval:

$$m(t)=m_1(t)+am_2(t) \quad (4)$$

where $$m_1(t)=\frac{g_M(t)+g_S(t)}{2} \quad (5)$$

$$m_2(t)=\frac{g_M(t)-g_S(t)}{2} \quad (6)$$

Component $m_1(t)$ is independent of random variable $a$ and provides the discrete parts of the spectral density. The continuous component is $m_2(t)$, where from (1), (2) and (6):

$$m_2(t)=\left[u(t)-u\left(t-\frac{T}{2}\right)\right]f(t) \quad (7)$$

for $$kT\leq t\leq (k+1)T$$

It is well known, for example see the article by H. J. Pushman entitled "Spectral Density Distributions of Signals for Binary Data Transmission," Journal of British IRE, vol. 25, February 1963, pp. 155–165, that the one-sided spectral density W($f$) is given by:

$$W(f)=\lim_{N\to\infty}\frac{2}{NT}\overline{|F(f)|^2} \quad (8)$$

where the bar indicates ensemble average.

Then the continuous component of spectral density is:

$$W_1(f)=\lim_{N\to\infty}\frac{2}{NT}\left\{\sum_{k=0}^{N-1}\sum_{l=0}^{N-1}\overline{a_k a_l}F(f)F^*(f)e^{-j\omega(k-l)T}\right\} \quad (9)$$

where $a$ with the subscript is the previously defined random variable and F($f$) is the Fourier transform of the pulse shape which in this case appears in (7). But $\overline{a_k a_l}=\delta_{kl}$ by independence and equal likelihood of Mark and Space. Therefore, (9) becomes:

$$W_1(f)=\frac{2}{T}\left|F(f)\right|^2 \quad (10)$$

Expression (7) may represent a sine wave, square wave or a pulse, all with unit amplitude. For sine wave and square wave the constraint that the carrier frequency $f_C=n/T$ holds, where $n$ is an integer equal to or greater than 2. Using (7), the Fourier transforms for the three respective pulse shapes are:

$$|F_1(f)|^2=\left(\frac{\tan \pi fT/2n}{\pi f}\right)^2\left(\begin{matrix}\sin^2 \pi fT/2 \\ \cos^2 \pi fT/2\end{matrix}\right)\begin{matrix}n \text{ even}\\ n \text{ odd}\end{matrix} \quad (11)$$

for square wave $$|F_2(f)|^2=\left(\frac{T}{n\pi}\right)^2\left\{\frac{1}{\left[1-\left(\frac{fT}{n}\right)^2\right]}\right\}^2\left(\begin{matrix}\sin^2 \pi fT/2 \; n \text{ even}\\ \cos^2 \pi fT/2 \; n \text{ odd}\end{matrix}\right) \quad (12)$$

for sine wave $$|F_3(f)|^2=\tau^2\left(\frac{\sin \pi f\tau}{\pi f\tau}\right)^2 \quad (13)$$

for a pulse where $\tau$ is the duration of the pulse and $\tau<T/2$.

When pulses are used, the duration $\tau$ for any particular system will depend on $n$ and must be such so as to avoid the aperture effect.

To summarize, the continuous component of spectral density at the input to the conversion filter at 34, FIGURE 2, 413, FIGURE 4, or 617, FIGURE 6, is expressed in (10) with either (11), (12) or (13) for F($f$) depending upon the pulse waveshape used.

Analog conversion of the signal is the next step and it is important to derive the desired spectral density at the output of the conversion filter. Here the Marks and Spaces are represented by two orthogonal waveshapes—sinusoids, separated in frequency by the bit rate and with zero degrees phase at the bit transition points. The two desired binary orthogonal waveshapes at the output of the conversion filter can be expressed as:

$$S_1(t)=\sin\frac{2\pi nt}{T} \quad (14)$$

for Mark $$S_2(t)=\sin\frac{2\pi mt}{T} \quad (15)$$

for Space for $nT\leq t<(n+1)T$ where $m=\left(\begin{matrix}n+1\\ n-1\end{matrix}\right)\begin{matrix}\text{for upper sideband}\\ \text{for lower sideband}\end{matrix}$ The continuous component of spectral density for binary FM with waveshapes 14 and 15 is:

$$W_2(f)=\frac{2}{T}|G(f)|^2 \quad (16)$$

where $$|G(f)|^2=\left(\frac{T\sin \pi fT}{2\pi}\right)^2\left\{\frac{1}{n\left[1-\left(\frac{fT}{n}\right)^2\right]}\quad\frac{1}{y\left[1-\left(\frac{fT}{y}\right)^2\right]}\right\}^2 \quad (17)$$

with $n$ an integer and $\geq 2$.

The desired characteristics of the upper or lower sideband conversion filter H($f$) in FIGURE 1 are obtained from 11 and 16 and:

$$|H(f)|^2=\frac{W_2(f)}{W_1(f)}=\left|\frac{G(f)}{F(f)}\right|^2 \quad (18)$$

where G($f$) appears in (17 and F($f$) is either (12), (13) or (14). In applying expression (18) it is convenient to use the following notation. Let $$x=n\left[1-\left(\frac{fT}{n}\right)^2\right]$$

$$z=m\left[1-\left(\frac{fT}{m}\right)^2\right] \text{ where } m=\left(\begin{matrix}n+1\\ n-1\end{matrix}\right)\begin{matrix}\text{for upper sideband}\\ \text{for lower sideband}\end{matrix}$$

$$w=\left(\begin{matrix}\cos \pi fT/2\\ \sin \pi fT/2\end{matrix}\right)\begin{matrix}n \text{ even}\\ n \text{ odd}\end{matrix}$$

$n$=number of carrier cycles per bit.

Omitting the constant factors, the chracteristics of the three conversion filters are simply expressed as:

$$|H_1(f)|^2=\left(\frac{f}{x}\right)^2(\cot \pi fT/2n)^2\,|H_3(f)|^2 \quad (19)$$

square wave carrier $$|H_2(f)|^2=\left(1-\frac{x}{z}\right)^2 w^2 \quad (20)$$

since wave carrier for $\frac{2n-1}{2T}\leq f\leq\frac{2n+3}{2T}$ and zero elsewhere, for upper sideband and $\frac{2n-3}{2T}\leq f\leq\frac{2n+1}{2T}$ and zero elsewhere, for lower sideband Assuming that the pulses of duration $\tau$ are sufficiently narrow so that (14) is nearly flat within the desired bandpass, the filter $|H_3(f)|^2$ is closely approximated by expression (17). For large values of $n$ expressions (19) and (20) become nearly identical.

In general, conversion filter frequency attenuation characteristics, $H(f)$, are non-symmetrical, unless waveshape (13) with narrow pulses is used, and is not difficult to approximate in practice. It has been found that it is possible to use a symmetrical filter without discernible degradation when the number of carrier cycles per bit is large. Such filters have the following characteristics:

$$S_U(f)=[\tfrac{1}{2}(1+\sin \pi fT)]^{\frac{1}{2}} \quad (21)$$

for upper sideband $$\text{for } \frac{2n-1}{2T} \leq f \leq \frac{2n+3}{2T}$$

and zero elsewhere $$S_L(f)=[\tfrac{1}{2}(1-\sin \pi fT)]^{\frac{1}{2}} \quad (22)$$

for lower sideband $$\text{for } \frac{2n-3}{2T} \leq f \leq \frac{2n+1}{2T}$$

and zero elsewhere

*Receiving techniques*

The orthogonal FM signal can be detected by conventional process such as, for example, the axis-crossing techniques of the prior art illustrated in FIGURE 1. However, there are two disadvantages to this method. First, the clock timing information is derived from the reconstructed binary data signal. This is a feedback approach and correction of the clock frequency follows the data. Thus, timing errors occur even where elaborate precautions are taken to minimize this effect. Second, it is well known that the equipment necessary to derive reaonably accurate clock timing information is expensive and complex. By employing the techniques of this invention these problems are virtually eliminated.

As explained hereinbefore, the orthogonal, synchronous, frequency modulated wave contains discrete as well as continuous components. The continuous component is the orthogonal, binary, frequency modulated signal which carries the digital data information. The discrete components consist of two steady tones, i.e., two frequencies which are present at all times and have exactly the same values $f_1$ and $f_2$ as the Mark and Space frequencies, respectively. These tones are coherently related to the information carrying frequencies and contain half of the total power. In the embodiment of my invention illustrated in FIGURE 9, axis-crossing generator 902, low-pass filter 903 and binary slicer 904 are a part of a conventional axis-crossing detector and these components could be similar to those represented in FIGURE 1 to illustrate the prior art. In the arrangement shown in FIGURE 9, however, improved performance is obtained by taking advantage of the inherent properties of the orthogonal FM signal. The discrete components of the incoming line signal at 901, $f_1$ and $f_2$, are selected by bandpass filters 906 and 907, respectively. As it was hereinbefore explained, the difference between $f_1$ and $f_2$ is equal to the bit rate $1/T$. This difference frequency is obtained by combining the respective outputs $f_1$ and $f_2$ of the two bandpass filters in modulator 908 and selecting, from the modulation products obtained, the difference frequency by bandpass filter 909. The receiving clock 910 is thereby controlled by the original bit rate and the sampling point is precisely controlled. Further, any variations in the original data rate will reflect in the frequency of the discrete components and in the frequency difference. Unlike other "synchronous" systems, slight variations in the data bit rate can be accommodated since the receiving clock is controlled by information contained in the binary FM wave.

As will be understood from the earlier portions of this description, in the generation of the line signal, the carrier frequency is related to the period, T, of the original binary data bit rate by the formula $f_C=n/T$ where $n$ is an integer equal to or greater than 2. Upper ($f_U$) and lower ($f_L$) sideband frequencies are obtained, one on either side of the carrier, and each frequency is related to the carrier and the binary data bit rate in the following way:

$$f_U=f_C+1/T \text{ and } f_L=f_C-1/T$$

Where the upper sideband is selected in the analog processing of the signal at the transmitting end, the carrier frequency $f_C$ represents Mark ($f_1$) and the upper frequency $f_U=f_2=f_C+1/T$, represents Space. For lower sideband, the carrier frequency represents Space ($f_2$) and the lower frequency, $f_L=f_1=f_C-1/T$, represents Mark. It is apparent from the above frequency relationship that if the Mark frequency $f_1$, has an odd number of cycles per bit, then the Space frequency, $f_2$, will have an even number of cycles per bit. This is shown graphically by the line frequency representation at ($b$) in FIGURE 8, which shows the result of selecting the upper sideband, with $f_1=3/T$ and $f_2=4/T$ as in the examples described above. The converse is equally true, that is, where the Mark frequency contains an odd number of cycles per bit, the Space frequency will contain an even number of cycles per bit.

As will now be explained with reference to FIGURES 8 and 10, this property of the line signal can be used in differentially coherent demodulation or detection. This technique, as also the absolute reference coherent process described further below with reference to FIGURE 11, are advantageous in recovering data under adverse signal-to-noise conditions. Under such conditions, the conventional methods of detection or demodulation have a threshold level below which the intelligence carried by an incoming signal is mutilated and cannot be reliably recovered.

Figure 8:
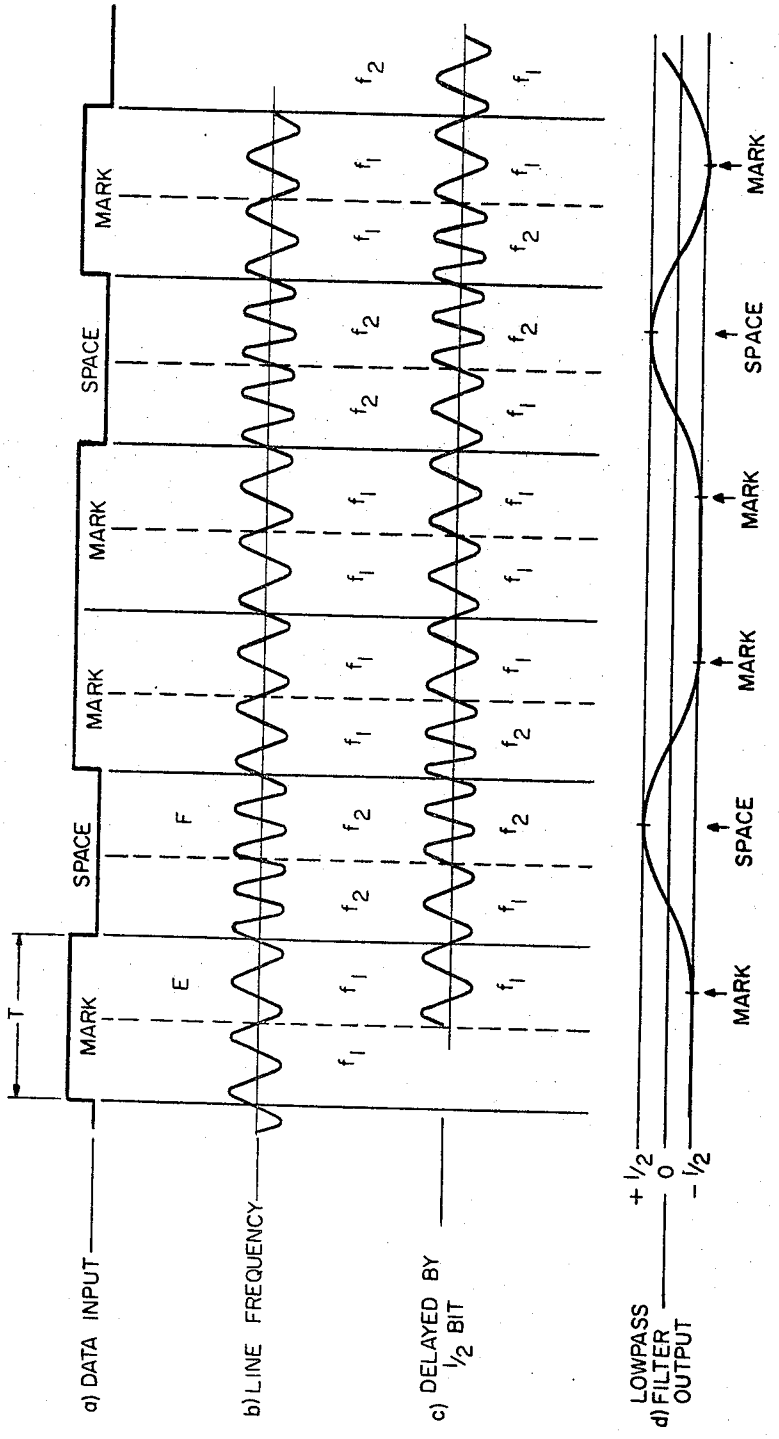
FIGURE 8 is a graphical illustration of the various waveshapes which occur in a system using the techniques of the invention and which shows the differentially coherent process of demodulation or detection illustrated in FIGURE 10.
Figure 10:
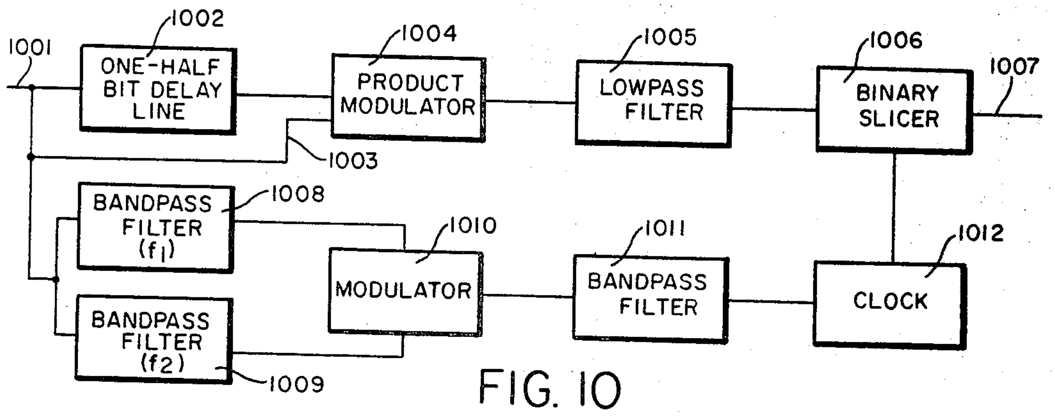
FIGURE 10 is a schematic circuit diagram of a differentially coherent arrangement by which demodulation or detection of the wave may be conducted.
Figure 11:
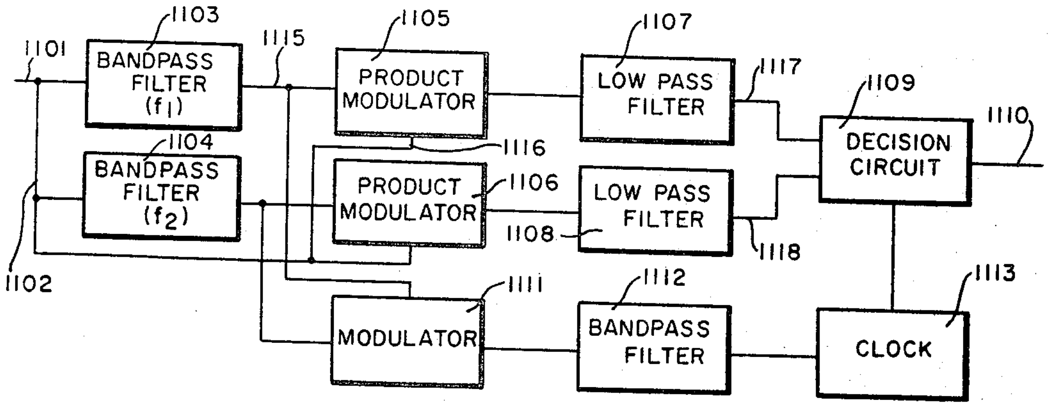
FIGURE 11 is a schematic circuit diagram of an absolute reference coherent arrangement by which demodulation or detection of the orthogonal FM signal may be accomplished.

Referring to FIGURE 10, the line signal at 1001, such for example as shown at ($b$) in FIGURE 8, is simultaneously applied to a delay line 1002 and to product modulator 1004. One-half bit delay is introduced by delay line 1004 and the delayed wave is shown at ($c$) of FIGURE 8. Thus, waves ($b$) and ($c$) of FIGURE 8 represent the two input signals to the product modulator 1004. When the components of the two input waves have the same frequency, they are either in phase or 180° out of phase, as shown at E and F of FIGURE 8. The frequency having an odd number of cycles per bit, $f_1$ in this example, will incur the 180° phase relationship. During the interval when this occurs, the product of the delayed and undelayed wave results in a $-\frac{1}{2}$ level signal at the sampling point indicated in line ($d$), and in an AC term of twice the frequency. For the frequency having an even number of cycles per bit, $f_2$, the delayed and undelayed waves are in phase and their product results in a $+\frac{1}{2}$ level signal at the sampling point and an AC term of twice the frequency. The AC term is always eliminated by lowpass filter 1005. Where the two input signals to the product modulator 1004 differ in frequency, the resulting product consists of AC terms which are the sum and difference frequencies of two input signals. The difference frequence is equal to the bit rate and this difference frequency as well as the sum frequency are eliminated by lowpass filter 1005 which follows the product modulator. The output of filter 1005 is shown at ($d$) in FIGURE 8. Comparing waves ($b$), ($c$) and ($d$) it is apparent that when the two frequencies are identical, a maximum or minimum will occur at the output of the lowpass filter. These maximums and minimums are the sampling points and identify the spacing and marking conditions of the original binary data signal. Where the two frequencies differ during a half-bit interval, a transition between Mark and Space or Space and Mark occurs. Reconstruction of the binary data, which appear at 1007, is achieved by sampling wave ($d$) at the binary data rate $1/T$ in binary slicer 1006, FIGURE 10.

Figure 9:
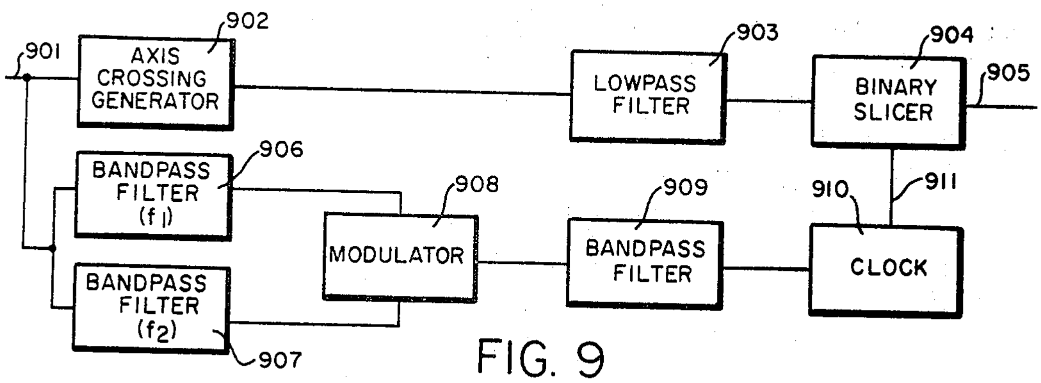
FIGURE 9 is a schematic circuit diagram of a noncoherent arrangement by which detection of the orthogonal FM signal may be conducted.

As shown in FIGURE 10, the bit clock frequency is derived from the difference frequency, $f_1 - f_2$, using bandpass filters 1008 and 1009, modulator 1010, bandpass filter 1011, and clock 1012, as explained hereinbefore for the embodiment of FIGURE 9.

Because of the discrete components present in the line frequency signal, recovery of the original data information may also be achieved by absolute reference coherent detection or demodulation. These discrete components have a coherent relationship with the continuous components which carry the information, carry half of the power and may be easily filtered out. An arrangement using absolute coherent reference detection is shown in FIGURE 11. The incoming line signal at 1101 is simultaneously applied to product modulators 1105 and 1106 and to bandpass filters 1103 and 1104. These are simple bandpass filters, and in practice it has been found that 3 db bandwidth of the order of 5% of the bit rate will suffice. There function is to select the discrete component from the line signal for each of the two steady frequencies that have exactly the same values, $f_1$ and $f_2$, as the Mark and Space frequencies. Thus, an absolute coherent reference is obtained for each condition. The discrete component representative of the Marking condition, $f_1$, is applied to product modulator 1105 and the discrete component representative of the Spacing condition, $f_2$, is applied to the product modulator 1106. When the discrete component is multiplied with the line signal a maximum output is obtained when the information bearing continuous component and the discrete component simultaneously represent the same condition of the original binary data wave. In the embodiment of FIGURE 11, the discrete component $f_1$, representing Mark, is always present at the input lead 1115 of product modulator 1105. When the incoming signal in lead 1116 is also representative of Mark the two signals are correlated and a maximum output occurs. Lowpass filter 1107 restricts transmission of signals to those below that of the binary data bit rate so that difference, sum and double frequency signals are excluded from the binary decision circuit 1109. In a similar manner, the product modulator 1106 has a maximum output only when the incoming line signal has a continuous component representative of Space. Again, lowpass filter 1108 restricts the frequencies passed to the decision circuit 1109 to frequencies below that of the bit rate. As a result of the modulation and filtering processes there will be an output at lead 1117 whenever there is a Mark and an output at lead 1118 whenever there is a Space in the incoming signal. Decision circuit 1109 determines in a manner well known in the art which of the two conditions is present during a bit interval and, at its output 1110, reconstructs the replica of the original binary data signal.

An absolute timing reference frequency can be derived as described hereinbefore using the output from bandpass filters 1103 and 1104 rather than adding separate bandpass filters for this purpose. The discrete frequency components from 1103 and 1104 are combined in modulator 1111 and the difference frequency, which is equal to the bit rate is selected by bandpass filter 1112 and used to control timing clock 1113.

Since the FM system described hereinbefore employs two orthogonal signals and provides an absolute reference in the form of a replica of these signals, the correlation detection with absolute reference depicted in FIGURE 11 is equivalent to employing Bayes' decision rule which is optimum in the presence of white gaussian noise. This rule leads to the concept of the distance between two signals which is $\sqrt{2E(1-\varphi)}$, where E is the signal energy per bit, assuming two signals of equal energy, and $\varphi$ the correlation coefficient. Inasmuch as $\varphi$ is zero in this case and the priori probabilities are qual, the well-known geometrical distance consideration of two equal vectors in quadrature leads to the probability of error of ½ erfc $\sqrt{E/2N_0}$ where $N_0$ is the power density per unit bandwidth of white gaussian noise.

Although the invention has been described hereinbefore with respect to specific illustrative embodiments, no limitations are intended nor are any to be implied therefrom. It will be understood that the invention is suceptible to modification in order to adapt it to different usages and conditions within the scope and spirit of the appended claims.

What is claimed is:

1. A method of generating a frequency modulated signal which represents the two states of a binary data signal having a predetermined bit interval, said method comprising first digitally coding, while introducing correlation into, said data signal, and then analog processing said coded signal to produce said frequency modulated signal so that said last-mentioned signal has two orthogonal frequencies representing the two states respectively of said binary signal, said frequencies differing by the bit rate of the binary data signal, having an integral number of cycles per bit interval, and having zero phase at the bit transition points of the last-mentioned signal.

2. A method of generating a frequency modulated signal which represents the two states, 1 and 0, of a binary data signal having a predetermined bit interval T, said method comprising a first step of deriving from a single frequency source pulses for digitally converting said binary data signal into a coded signal having two different combinations of binary digits for said two states respectively, and a second step of analog processing said coded signal to produce said frequency modulated signal so that said last-mentioned signal has two frequencies representing the two states respectively of said binary signal, said frequencies differing by the bit rate of the binary data signal, having an integral number of cycles per bit interval and having zero phase at the bit transition points of the last-mentioned signal.

3. The method as claimed in claim 2, wherein said first step includes converting said binary data signal into a coded signal in which the two states of said binary data signal are represented by binary digits 10 and 00, respectively.

4. The method as claimed in claim 3, wherein said first step includes converting said binary data signal into a carrier signal which is two-phase double-sideband modulated so that the two states of said binary data signal are represented by the phase codes 10 and 00 respectively, with one of the binary digits in said code being 0° phase and the other binary digit in said code being 180° phase.

5. The method as claimed in claim 4, wherein the frequency of said carrier is $f_C = n/T$, where $n$ is the number of carrier cycles per bit and is an integer and equal to or greater than 2.

6. The method as claimed in claim 5, wherein said carrier is a square wave carrier.

7. The method as claimed in claim 6, wherein said second step includes constraining the spectral density of said two-phase double-sideband modulated signal by single-sideband filter means of the characteristic $$|H_1(f)|^2 = \left(\frac{f}{x}\right)^2 (\cot \pi f T/2n)^2 |H_2(f)|^2$$

$$|H_2(f)|^2 = \left(1 - \frac{x}{z}\right)^2 w^2$$

where $$x = n\left[1 - \left(\frac{fT}{n}\right)^2\right]$$

$$z = m\left[1 - \left(\frac{fT}{m}\right)^2\right]$$

with $$m=\begin{pmatrix} n+1 \\ n-1 \end{pmatrix}\begin{matrix}\text{for upper sideband} \\ \text{for lower sideband}\end{matrix}$$

and $$w=\begin{pmatrix} \cos \pi fT/2 \\ \sin \pi fT/2 \end{pmatrix}\begin{matrix} n \text{ even} \\ n \text{ odd}\end{matrix}$$

for $$\frac{2n-1}{2T}\leq f\leq\frac{2n+3}{2T}$$

and zero elsewhere for upper sideband, and $$\frac{2n-3}{2T}\leq f\leq\frac{2n+1}{2T}$$

and zero elsewhere for lower sideband

8. The method as claimed in claim 5, wherein said carrier is a sine wave carrier.

9. The method as claimed in claim 8, wherein said second step includes constraining the spectral density of said two-phase double-sideband modulated signal by single-sideband filter means of the characteristic $$|H_2(f)|^2=\left(1-\frac{x}{z}\right)^2 w^2$$

where $$x=n\left[1-\left(\frac{fT}{n}\right)^2\right]$$

$$z=m\left[1-\left(\frac{fT}{m}\right)^2\right]$$

where $$m=\begin{pmatrix} n+1 \\ n-1 \end{pmatrix}\begin{matrix}\text{for upper sideband} \\ \text{for lower sideband}\end{matrix}$$

and $$w=\begin{pmatrix} \cos \pi fT/2 \\ \sin \pi fT/2 \end{pmatrix}\begin{matrix} n \text{ even} \\ n \text{ odd}\end{matrix}$$

for $$\frac{2n-1}{2T}\leq f\leq\frac{2n+3}{2T}$$

and zero elsewhere for upper sideband, and $$\frac{2n-3}{2T}\leq f\leq\frac{2n+1}{2T}$$

and zero elsewhere for lower sideband

10. The method as claimed in claim 3, wherein said first step includes converting said binary data signal into a train of narrow, positive or negative pulses of equal magnitude, with one state of said binary data signal being represented by a positive pulse followed by a negative pulse, and the other state by two consecutive negative pulses.

11. Apparatus for generating a frequency modulated signal which represents the two states, 1 and 0, of a binary data signal having a predetermined bit interval, said frequency modulated signal containing two orthogonal frequencies differing by the binary data rate and having zero phase at the bit transition points; said apparatus comprising a single frequency source from which a train of pulses of twice the bit rate of said binary data signal is obtained, means including a bistable device gated in a complementary manner by a combination of said binary data signal and said train of pulses for providing a coded waveform in which one state of said binary data signal is represented by the phase code 10 and the other state by the phase code 00, one of the binary digits in said code being 0° phase and the other binary digit being 180° phase, and filter means for converting said coded waveform into said frequency modulated signal.

12. Apparatus as claimed in claim 11 wherein said single frequency source is a carrier generator; wherein there is also provided a data clock pulse generator and a frequency divider, said data clock pulse generator being controlled from said carrier generator through the medium of said frequency divider so that said train of pulses having twice the bit rate of said binary data signal is provided by the output of said data clock pulse generator and so that the pulses of said train are delayed relative to the bit transition points of said binary data signal, and wherein there is also provided an AND gate for combining said binary data signal with the output of said data clock pulse generator.

13. Apparatus as claimed in claim 12 and comprising an OR gate for combining the output of said AND gate with the output of the carrier generator, said carrier generator output providing a pulse train of a pulse rate twice the desired carrier frequency of said coded waveform, and the output of said OR gate being connected to the input of said bistable device so that the output of said device furnishes said coded waveform in the form of a two-phase modulated square wave carrier.

14. Apparatus as claimed in claim 12, wherein the output of said AND gate is connected to the input of said bistable device, and wherein there is provided means for modulating said output of the carrier generator with the output of said bistable device, said carrier generator output delivering to said modulating means a sine wave having the desired carrier frequency of said coded waveform, and the output of said modulating means being connected to the input of said filter means.

15. Apparatus as claimed in claim 11, wherein there are provided means for deriving from the output of said bistable device a train of narrow pulses of opposite polarity and equal magnitude in which one state of the original binary data is represented by a pulse of one polarity followed by a pulse of the opposite polarity, while the other state is represented by two consecutive pulses of said opposite polarity.

16. Apparatus as claimed in claim 11, wherein said filter means comprises a bandpass filter designed to pass the upper sideband or the lower sideband of said frequency modulated signal, said upper sideband, if selected, including at its lower end the lower frequency, $f_L$, of said two orthogonal frequencies, being equal to the effective carrier frequency, $f_C$, of said coded waveform, and at its upper end the upper frequency, $f_U=f_C+1/T$, of said two orthogonal frequencies, and said lower sideband, if selected, including at its upper end the upper frequency, $f_U$, of said two orthogonal frequencies, being equal to said effective carrier frequency, $f_C$, and at its lower end the lower frequency, $f_L=f_C-1/T$, of said two orthogonal frequencies, where $1/T$ is the bit rate of said binary data signal.

17. A method for synchonously detecting a binary orthogonal frequency modulated signal; the continuous component of said signal comprising two frequencies representing Mark and Space respectively of a binary data signal having a predetermined bit interval, said Mark and Space frequencies differing by the bit rate of the binary signal so as to be locked thereto, containing an integral number of cycles during a bit interval and having zero phase at the bit transition points of the binary data signal; and the discrete components of said frequency modulated signal comprising two steady frequency equal in value to said Mark and Space frequencies respectively and having a fixed phase with respect to said bit transition points; said method comprising extracting from said discrete component of the frequency modulated signal the difference between said two steady frequencies, and deriving from said difference a bit clock reference for the recovery of said binary data signal from said frequency modulated signal.

18. The method as claimed in claim 17, wherein said binary data signal is recovered from said continuous component by an axis-crossing detection process.

19. The method as claimed in claim 17, wherein said binary data signal is recovered from said continuous component by a differentially coherent detection process.

20. The method as claimed in claim 17, wherein said binary data signal is recovered from said frequency modulated signal by an absolute reference coherent detection process based on a comparison of said continuous component with said discrete component.

21. Apparatus for detecting a binary orthogonal frequency modulated signal the continuous component of which comprises two frequencies representing the two states Mark and Space, respectively of a binary data signal having a predetermined bit interval, said Mark and Space frequencies differing by the bit rate of the binary signal so as to be locked thereto, containing an odd number of cycles during a bit interval corresponding to one said state and an even number of cycles during a bit interval corresponding to the other said state, and having zero phase at the bit transition point; said apparatus comprising means for delaying said frequency modulated signal by one half bit interval, product modulator means for comparing the undelayed frequency modulated signal with the delayed frequency modulated signal, lowpass filter means connected to the output of said product modulator means for eliminating alternating current components in the output of said filter means, which are equal to or greater than said bit rate, whereby at the last-mentioned output a wave is obtained which has a minimum level during half-bit intervals wherein both of the two compared frequencies have an odd number of cycles, and has a maximum level during half-bit intervals wherein both of the two compared frequencies have an even number of cycles, said minimum and maximum level being indicative of one and the other state respectively of said binary data signal, and means for synchronously sampling said wave at the binary data rate, thereby to produce a replica of the last-mentioned signal.

22. Apparatus for detecting a binary orthogonal frequency modulated signal, as claimed in claim 21, said signal also having discrete components comprising two steady frequencies equal in value to said Mark and Space frequencies respectively and having a fixed phase with respect to said bit transition points, and said apparatus also comprising modulating means, two filters on the inputs of which said frequency modulated signal is impressed, said two filters being designed to select two steady frequencies respectively and the outputs of said two filters being connected to the input of said modulating means, a bandpass filter connected to the output of said modulating means and designed to pass the difference between said two steady frequencies, and a bit clock having its input connected to the output of said bandpass filter, the output of said bit clock being connected to said sampling means for synchronizing the last-mentioned means.

23. Apparatus for detecting a binary orthogonal frequency modulated signal; the continuous component of said signal comprising two frequencies representing Mark and Space respectively of a binary data signal having a predetermined bit interval, said Mark and Space frequencies differing by the bit rate of the binary signal so as to be locked thereto, containing an integral number of cycles during a bit interval and having zero phase at the bit transition points of the binary data signal; and the discrete components of said frequency modulated signal comprising two steady frequencies equal in value to said Mark and Space frequencies respectively and having a fixed phase with respect to said bit transition points; said apparatus comprising a first bandpass filter for extracting from said signal said first steady frequency, a second bandpass filter for extracting from said signal said second steady frequency, a first product modulator with one input having said signal impressed thereon and with another input connected to the output of said first bandpass filter, the output of said first modulator thus having a maximum output when the continuous component of said signal represents the state corresponding to said first steady frequency, a second product modulator with one input having said signal impressed thereon and with another input connected to the output of said second bandpass filter, the output of said second modulator thus having a maximum output when the continuous component of said signal represents the state corresponding to said second steady frequency; a first and a second lowpass filter respectively connected to the output of said two modulators and designed to pass only frequencies lower than said bit rate; and a synchonously controlled decision circuit having two inputs respectively connected to the output of said two lowpass filters, said decision circuit determining in accordance with said maximum outputs which of said two states is present during any given bit interval, thereby to produce at its output a replica of said binary data signal.

24. Apparatus as claimed in claim 23, and also comprising modulating means having a first input connected to the output of said first bandpass filter and a second input connected to the output of said second bandpass filter, a third bandpass filter connected to the output of said modulating means and designed to pass the difference between said two steady frequencies, and a bit clock having its input connected to the output of said third bandpass filter, the output of said bit clock being connected to said decision circuit for synchronizing said circuit.

25. A system for transmitting a frequency modulated signal, which represents the two states, Mark and Space, of a binary signal having a predetermined bit interval, over a transmission channel; said system comprising at the transmitting end a single frequency source, means deriving from said source pulses for digitally converting said binary data signal into a coded signal having two different combinations of binary digits for said two states respectively, a bandpass filter the input of which is connected to the output of said digital conversion means and the output of which is connected to said channel so that the frequency modulated signal transmitted over said channel has a continuous component comprising two frequencies representing Mark and Space respectively of said binary signal, said frequencies differing by the bit rate of the binary signal so as to be locked thereto, containing an integral number of cycles during a bit interval and having zero phase at the bit transition points of the binary data signal, and comprising two steady frequencies equal in value to said Mark and Space frequencies respectively and having a fixed phase with respect to said bit transition points; and said system comprising at the receiving end means connected to said channel for recovering said binary data signal from said frequency modulated signal, and means for deriving from the difference of said discrete component of the frequency modulated signal a bit clock reference for synchronizing said recovering means.

26. A system as claimed in claim 25, wherein said recovering means comprises an axis-crossing detector for reproducing said binary data signal from the continuous component of said frequency modulated signal.

27. A system as claimed in claim 25, wherein said recovering means comprises differentially coherent detection apparatus for reproducing said binary data signal from the continuous component of said frequency modulated signal.

28. A system as claimed in claim 25, wherein said recovering means comprises absolute reference coherent detection apparatus for reproducing said binary data signal from the discrete component of said frequency modulated signal.

29. Apparatus as claimed in claim 11, wherein said single frequency source is a data clock pulse generator which provides said train of pulses of twice the bit rate of said binary data signal, and wherein there are provided means for deriving from said data clock pulse generator a series of pulses of one polarity which is delayed with respect to the bit transition points of said binary data signal, means for deriving from said delayed series a corresponding series of pulses of the opposite polarity, and means for gating the pulses of said two series through to said filter means under the control of the output of said bistable device.

References Cited

UNITED STATES PATENTS 3,263,185 7/1966 Lender ----------- 325—38 X
3,305,634 2/1967 Rusick ----------- 325—40 X ROBERT L. GRIFFIN, *Primary Examiner.*

J. T. STRATMAN, *Assistant Examiner.*